Patented July 2, 1940

2,206,127

UNITED STATES PATENT OFFICE

2,206,127

VAT DYESTUFFS OF THE ANTHRAQUINONE SERIES

Otto Schlichting, Ludwigshafen-on-the-Rhine, Germany, assignor to General Aniline & Film Corporation, a corporation of Delaware No Drawing. Original application July 7, 1937, Serial No. 152,375. Divided and this application December 16, 1938, Serial No. 246,125. In Germany July 8, 1936

6 Claims.  (Cl. 260—307)

The present invention relates to vat dyestuffs of the anthraquinone series and has been divided out from my copending application Ser. No. 152,375, filed July 7, 1937, now U. S. Patent 2,168,174, issued August 1, 1939.

I have found that compounds of the anthraquinone series having the general composition

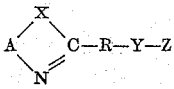

(in which A is the radical of an anthraquinone, X is oxygen, sulphur, selenium, tellurium or an imino group, R is a radical of the benzene series, Y is an imino group or one of the groups —CO—NH— or —NH—CO— and Z is a cyclic radical) are valuable vat dyestuffs.

The said compounds may be prepared by causing compounds of the structure

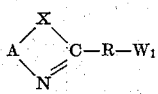

to react with compounds of the structure Z—W$_2$, W$_1$ and W$_2$ being halogen, a hydroxy, amino or cyano group or a carboxylic acid, carboxylic acid amide, carboxylic acid anhydride or carboxylic acid halide group and the initial materials be so selected that the groups W$_1$ and W$_2$ allow the radical

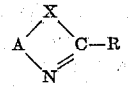

to join with the radical Z by means of Y, or by causing compounds of the composition Z—Y—R—V in which V is one of the groups —COOH, —COHalogen, —CHO, —CH(Halogen)$_2$, —C(Halogen)$_3$ or —CONH$_2$ to react with aminoanthraquinones which allow of the attachment of an azole ring; for example anthraquinoneazoles which contain on the carbon atom of the azole ring at least one non-hydrogenated ring incapable of vatting which contains at least one exchangeable negative radical (as for example halogen atoms or nitro groups) may be caused to react with cyclic compounds which contain at least one exchangeable hydrogen atom attached to nitrogen (as for example primary or secondary amino derivatives of cyclic compounds), or amides of cyclic carboxylic acids may be caused to react with anthraquinoneazoles of the said kind. The compounds thus obtainable are either imino compounds or carboxylic acid amides.

The carboxylic acid amides are obtained when anthraquinoneazoles having at least one non-hydrogenated ring incapable of vatting attached to the azole ring which contains an amino group with a replaceable hydrogen atom are treated with acylating agents containing a cyclic radical Z. Furthermore anthraquinoneazoles of the said kind which contain an amino group in the ring attached to the azole ring may also be caused to react with amides of cyclic carboxylic acids in the presence of acid agents. Cyclic amino compounds having at least one replaceable hydrogen atom may also be caused to react with anthraquinoneazoles containing at least one non-hydrogenated ring incapable of vatting attached to the azole ring and in the ring a carboxyl group in a form which renders it capable of forming acid amides.

Another way of preparing the new dyestuffs consists in causing cyclic compounds containing, attached by way of an amino or carboxylic amide group, at least one non-hydrogenated ring incapable of vatting and in this ring a carboxylic, carboxylic acid amide, carboxylic acid halide, aldehyde, di- or tri-halogenmethyl group, to react with aminoanthraquinones which are capable of reacting with the said compounds with the formation of an azole ring. In this connection there may be mentioned for example aminoanthraquinones containing halogen or a hydroxy, mercapto, seleno, telluro or amino group in ortho-position to the amino group. The preparation of thiazoles may also be carried out by effecting the reaction with the aminoanthraquinone while simultaneously or subsequently adding sulphur or sulphurizing agents. A similar procedure holds good for the preparation of the selenazoles. In many cases, other processes usual for the preparation of azoles may be used.

The anthraquinoneazoles described as initial materials at the commencement of the third paragraph of the description may contain the azole ring at any two adjacent positions of the anthraquinone. In addition to the groups necessary for the reaction contained in the ring situated on the azole ring, the compounds may contain any desired atoms or groups in the said ring or in the anthraquinone part of the molecule. They may be obtained by the processes usual for the preparation of anthraquinone azoles. The compounds the radical Z of which is attached to the carbon atom of the azole ring by the bridge R—Y— may belong to the benzene, naphthalene, anthracene, pyrene, perylene, anthraquinone, anthrapyrimidine, anthanthrone, pyranthrone, dibenzpyrenequinone, naphthindenone, benzanthrone, benzanthraquinone, azanthraquinone, azabenzanthrone, anthrapyridone, pyrazolanthrone, thiazolanthrone, anthraquinonebenzacridone, anthraquinonethioxanthrone series or also to the azanaphthalene, azanthracene, azaphenanthrene, azapyrene, azaperylene and carbazole series.

The reaction is usually effected by heating and preferably in the presence of a diluent. In many cases it may be promoted by the addition of catalytic substances, as for example copper and its compounds and/or by using agents binding acids.

The new vat dyestuffs thus obtainable have various shades of color depending on the initial materials. The yields are usually very good and in most cases correspond to the theoretical yields. If necessary the dyestuffs may be purified by the usual methods, as for example by crystallization or by treatment with oxidizing agents and in many cases also by way of their salts with strong acids or by vatting. They are distinguished by good fastness to light, chlorine and kier boiling.

The following examples will further illustrate how the said invention may be carried out in practice but the invention is not restricted to these examples. The parts are by weight.

*Example 1*

A mixture of 18 parts of C.4'-chlorphenylanthraquinone-1(N).2-oxazole (obtained from 1-amino-2-hydroxyanthraquinone by boiling with para-chlorbenzoyl chloride in nitrobenzene), 11.3 parts of 1-aminoanthraquinone, 8 parts of dehydrated sodium acetate, 1 part of copper acetate and 250 parts of nitrobenzene is heated to boiling in a stirring vessel until initial material is no longer present. After cooling, the whole is filtered off by suction and the resulting dyestuff is washed with nitrobenzene, alcohol and water and dried. It is a brown crystal powder which does not melt even at 360° C. and which dissolves in concentrated sulphuric acid giving a green-yellow coloration which changes to blue-green upon the addition of formaldehyde. It dyes vegetable fibres very fast brown-red shades from a red vat and has the following composition:

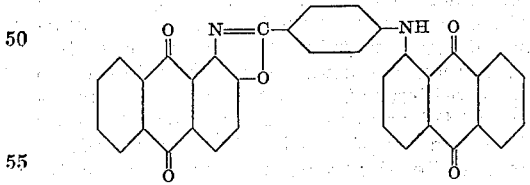

A similar dyestuff is obtained by reacting C.4'-aminophenylanthraquinone-1(N).2-oxazole with 1-chloranthraquinone.

If C.4'-chlorphenylanthraquinone - 1.2 - imidazole, or the corresponding -1(S).-2(N)-thiazole be used instead of C.4'-chlorphenylanthraquinone-1(N).3-oxazole, fast vat dyestuffs are also obtained.

*Example 2*

A mixture of 18 parts of C.4'-chlorphenylanthraquinone-1(N).2-oxazole, 17.2 parts of 1-amino-5-benzoylaminoanthraquinone, 8 parts of anhydrous sodium acetate, 1 part of copper acetate and 250 parts of nitrobenzene is heated in a stirring vessel as described in Example 1 and worked up in the manner described therein. A red-brown dyestuff is obtained which dissolves in concentrated sulphuric acid giving a yellow coloration which changes to green upon the addition of formaldehyde. It dyes cotton red-brown shades of very good fastness properties from a red vat.

If 1-amino-4-benzoylaminoanthraquinone be used instead of 1-amino-5-benzoylaminoanthraquinone, an olive dyestuff is obtained which dyes vegetable fibres olive shades of good fastness from a red vat.

For the preparation of this dyestuff, C.4'-aminophenylanthraquinone-1(N).2-oxazole may be used instead of the C.4'-chlorphenyl compound, the said initial material being reacted with the 1-chlor-5-benzoylaminoanthraquinone and 1-chlor - 4 - benzoylaminoanthraquinone, respectively.

*Example 3*

A mixture of 18.5 parts of C.3'-nitrophenylanthraquinone-1(N).2-oxazole, 11.2 parts of 1-aminoanthraquinone, 8 parts of sodium acetate, 1 part of copper acetate and 200 parts of nitrobenzene is heated to boiling while stirring for about 20 hours. The whole is then allowed to cool to about 80° C. and the resulting dyestuff is filtered off by suction, washed with nitrobenzene, methanol and water and dried. A grey-brown powder is thus obtained which dissolves in concentrated sulphuric acid giving a yellow coloration and which dyes cotton yellow-olive shades from a red vat.

If 1-amino-5-benzoylaminoanthraquinone be used instead of 1-aminoanthraquinone, a brown dyestuff is obtained which dyes cotton olive shades from a red vat.

When the oxazoles obtainable by causing 1-amino-2-hydroxyanthraquinone or 2-amino-3-hydroxyanthraquinone to react with nitro- or halogen-methylbenzoyl chlorides are used instead of C.3'-nitrophenylanthraquinone - 1(N).2 - oxazole, very fast vat dyestuffs are also obtained.

*Example 4*

A mixture of 20 parts of C.2'.4'-dichlorphenylanthraquinone-1(N).2-oxazole (obtainable from 1-amino-2-hydroxyanthraquinone by heating with 2,4-dichlorbenzoyl chloride in nitrobenzene), 17.5 parts of 1-amino-5-benzoylaminoanthraquinone, 8 parts of sodium acetate, 1 part of copper acetate and 250 parts of nitrobenzene is heated to boiling for about 15 hours while stirring. The whole is filtered by suction while hot and the residue is washed with nitrobenzene, methanol and water and dried. A dark brown crystal powder is thus obtained which dissolves in concentrated sulphuric acid giving a yellow coloration and which dyes cotton brown shades from a red vat.

If, instead of C.2'.4'-dichlorphenylanthraquinone-1(N)-2-oxazole, the corresponding 3'.4'-dichloro derivative be used, a dyestuff is obtained which dyes cotton brown-red shades. By using the 2'.5'-dichloro derivative, a dyestuff is obtained which dyes cotton currant-brown shades.

If the 1-amino-5-benzoylaminoanthraquinone be replaced by 1-aminoanthraquinone, more reddish dyestuffs are obtained. If it be replaced by 1-amino-4-benzoylaminoanthraquinone, grey to olive dyestuffs are obtained.

*Example 5*

A mixture of 13 parts of 1-amino-2-hydroxyanthraquinone, 2 parts of 4'-(1-anthraquinonylamino)-benzoyl chloride (obtainable by the reaction of para-aminobenzoic acid with 1-chloranthraquinone and treatment of the resulting 4'-(1-anthraquinonylamino)-benzoic acid with thionyl chloride), 0.4 part of para-toluenesulphonic acid and 300 parts of nitrobenzene is heated to boiling for about 2 hours. After cooling, the whole is filtered by suction and the residue washed with nitrobenzene and alcohol. The dyestuff obtained is a red-brown powder which dissolves in concentrated sulphuric acid giving a yellow-green coloration and which dyes vegetable fibres brown-red shades from a red vat. It agrees with the dyestuff obtainable according to Example 1.

If 4'-(1-anthraquinonylamino)-benzoyl chloride be allowed to act on 2-hydroxy-3-aminoanthraquinone, the corresponding 2.3-anthraquinoneoxazole is obtained; by the action on ortho-mercaptoaminoanthraquinones, the corresponding anthraquinonethiazole derivatives are formed.

Example 6

A mixture of 18 parts of C.4'-chlorphenylanthraquinone-2.3-oxazole (obtainable by heating 2-amino-3-hydroxyanthraquinone- with para-chlorbenzoyl chloride in nitrobenzene), 17 parts of 1-amino-4-benzoylaminoanthraquinone, 8 parts of sodium acetate, 1 part of copper acetate and 250 parts of nitrobenzene is heated to boiling, while stirring, until the formation of the dyestuff is completed. After cooling, the dyestuff is filtered off by suction and the residue washed with nitrobenzene, methanol and water; it is a dark-green powder which is soluble in sulphuric acid giving a green-yellow coloration. It dyes cotton fast olive-green shades from a green-brown vat.

If instead of 1-amino-4-benzoylaminoanthraquinone 1-aminoanthraquinone or 1-amino-5-benzoylaminoanthraquinone is employed, there is obtained a dyestuff giving a brown-red or brown coloration, respectively.

C.3' - chlorphenylanthraquinone, - 2.3 - oxazole may also be employed instead of C.4'-chlorphenylanthraquinone-2.3-oxazole in which case the shade of color of the resulting dyestuff is rather different from that obtained when using C.4'-chlorphenylanthraquinone-2.3-oxazole.

What I claim is:

1. A vat dyestuff of the general formula

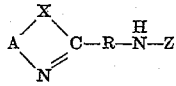

wherein A stands for the radical of an anthraquinone, X for a member selected from the class consisting of —O—, —S—, and —NH—, R for a phenylene radical and Z for an anthraquinone radical the azole ring shown being attached to adjacent positions of A, the C and —NH atoms shown being linked directly to carbon atoms of the said phenylene ring and the —NH group shown being linked directly to a carbon atom of the said anthraquinone nucleus.

2. A vat dyestuff of the general formula

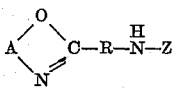

wherein A stands for the radical of an anthraquinone, R for a phenylene radical and Z for an anthraquinone radical the azole ring shown being attached to adjacent positions of A, the C and —NH atoms shown being linked directly to carbon atoms of the said phenylene ring and the —NH group shown being linked directly to a carbon atom of the said anthraquinone nucleus.

3. A vat dyestuff of the general formula

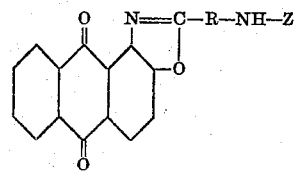

wherein R stands for a phenylene radical and Z for the radical of an anthraquinone, and C and —NH atoms shown being linked directly to carbon atoms of the said phenylene ring and the —NH group shown being linked directly to a carbon atom of the said anthraquinone nucleus.

4. A vat dyestuff of the general formula

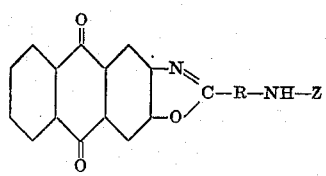

wherein R stands for a phenylene radical and Z for the radical of an anthraquinone, the C and —NH atoms shown being linked directly to carbon atoms of the said phenylene ring and the —NH group shown being linked directly to a carbon atom of the said anthraquinone nucleus.

5. The vat dyestuff of the formula

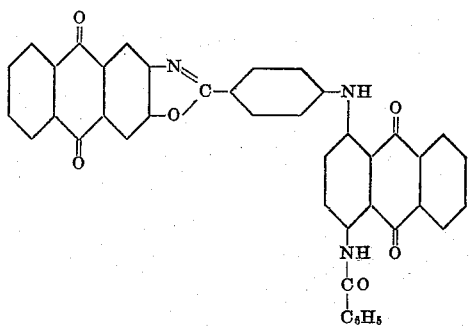

6. The vat dyestuff of the formula

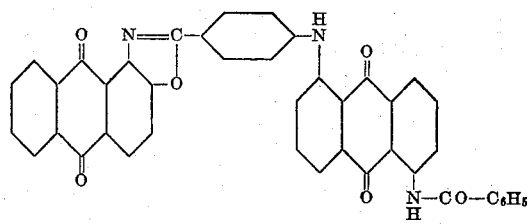

OTTO SCHLICHTING.